United States Patent
Kim

(10) Patent No.: US 7,670,304 B2
(45) Date of Patent: Mar. 2, 2010

(54) VERTICAL MOVEMENT VIBRATOR OF MAGNETIC GAP TYPE

(76) Inventor: Bang Bea Kim, 238-230 Jangwi-Dong, Seongbuk-Gu, Seoul 136-140 (KR)

( * ) Notice: Subject to any disclaimer, the term of this patent is extended or adjusted under 35 U.S.C. 154(b) by 664 days.

(21) Appl. No.: 11/571,339

(22) PCT Filed: Jun. 24, 2005

(86) PCT No.: PCT/KR2005/001973

§ 371 (c)(1),
(2), (4) Date: Dec. 27, 2006

(87) PCT Pub. No.: WO2006/001656

PCT Pub. Date: Jan. 5, 2006

(65) Prior Publication Data

US 2007/0249974 A1    Oct. 25, 2007

(30) Foreign Application Priority Data

Jun. 28, 2004    (KR)    ........................ 10-2004-0049087

(51) Int. Cl.
*A61H 23/02* (2006.01)
(52) U.S. Cl. .................................... 601/66; 601/78
(58) Field of Classification Search ............... 601/1, 601/46, 51, 66, 78–81, 97, 98, 101, 103, 601/7, 108, 111; 310/81
See application file for complete search history.

(56) References Cited

U.S. PATENT DOCUMENTS

| | | | | |
|---|---|---|---|---|
| 2,985,166 A | * | 5/1961 | Burkardt | ........................ 601/18 |
| 4,069,816 A | * | 1/1978 | Yamamura et al. | ............. 601/81 |
| 4,710,655 A | * | 12/1987 | Masaki | ........................ 310/30 |
| 5,361,437 A | * | 11/1994 | Zhu et al. | ........................ 5/639 |
| 6,404,896 B1 | * | 6/2002 | Yoo et al. | ................... 381/401 |
| 2004/0230142 A1 | * | 11/2004 | Park | ............................. 601/51 |

FOREIGN PATENT DOCUMENTS

| | | |
|---|---|---|
| JP | 06-007408 | 1/1994 |
| JP | 07-323068 | 12/1995 |
| JP | 11-074115 | 3/1999 |
| JP | 2000-252117 | 9/2000 |
| KR | 200338511 | 1/2004 |

* cited by examiner

*Primary Examiner*—Danton DeMille
(74) *Attorney, Agent, or Firm*—IPLA P.A.; James E. Bame

(57) ABSTRACT

A vertical movement vibrator of a magnetic gap type is provided. The vibrator can provide a sufficient vertical movement force by a structure that a bobbin coil connected to a vibration plate is disposed in a magnetic gap of a magnetic circuit. The vibrator includes a magnetic circuit which forms an annular magnetic gap, and forms a DC magnetic field in the magnetic gap, a driving coil which is movably inserted into the magnetic gap, the driving coil being vibrated up and down when a driving signal is applied, a driving signal supply unit for supplying the driving signal, a vibration plate to the lower side of which the bobbin is attached to accomplish vibration up and down, a vertical movement guide unit for guiding the vibration plate to perform vertical movement, and a unit which limits a movement range of the vibration plate, and simultaneously absorbs an impact.

10 Claims, 1 Drawing Sheet

VERTICAL MOVEMENT VIBRATOR OF MAGNETIC GAP TYPE

TECHNICAL FIELD

The present invention relates to a vertical movement vibrator of a magnetic gap type, and more particularly to, a vertical movement vibrator of a magnetic gap type which can provide a sufficient vertical movement force by employing a structure of disposing a bobbin coil connected to a vibration plate in a magnetic gap of a magnetic circuit using an electric magnet which can produce a strong magnetic force.

BACKGROUND ART

People have no problems of eating and living in the modern industrialized countries. Also, high-calorie foods are recently affluent. Thus, if people have not worried about becoming fat, they are apt to catch a disease called fatness. It is well known that fatness has a relation with an adult's disease such as a heart disease, a high blood pressure disease, and a diabetes disease. In the field of an orthopedic surgery, doctors are interested in fatness which is known that fatness is involved with bone arthritis.

The best fatness cure is a controlled meal and a proper exercise. It has been known that it is desirable to reduce body fat through a diet cure taking proper nutrients and calorie, an aerobic exercise burning fat in the blood, and a muscle strengthening exercise.

In the case that a person tries to reduce his or her weight abruptly within a short period of time, health may get worse due to various types of side effects. Thus, in order to cure fatness safely while avoiding a yo-yo phenomenon, it is necessary to take a general and persistent treatment through a diet cure, an exercise cure and a medicinal therapy.

Meanwhile, in case of serious fatness, a walking or jogging exercise may make a bad influence upon the joints of the knee. Accordingly, the persons who suffer from the serious fatness have the tendencies of escaping from the walking or jogging exercise. As a result, the persons who suffer from the serious fatness use an abdominal vibration belt as a small impact exercise as well as an aerobic exercise, or use a running machine which is operates at low speed.

As a whole body exercise instrument which helps a user to make an aerobic exercise and does not give a burden to an articulation, a ligament, a tendon, etc., a vertical movement vibrator has been proposed. Vertical movement generated from the vertical movement vibrator makes a user compulsively move up and down periodically. Accordingly, contraction and relaxation of the muscles is repeated. As a result, even small-sized muscles including large-sized muscles of the human body are induced to raise tensions, to thus make the muscles consume a more amount of calories than a general aerobic exercise. Therefore, the vertical movement vibrator is used as an exercise training instrument which is appropriate for strengthening of the muscles and diet, in particular, a diet for serious fatness or abdominal fatness.

A vibrator using a rotational motor is known as a conventional vertical movement vibrator. The rotating-type vertical movement vibrator applies vibration to the abdominal region according to setting of a proper frequency, to thus give a user to take an aerobic exercise. Accordingly, the rotating-type vertical movement vibrator is medically used for the abdominal fatness patient.

However, the conventional vertical movement vibrator includes an eccentric weight provided on the rotational shaft of the rotational motor, and vibrates a support plate up and down while rotating. Accordingly, partial wear of bearings becomes severe due to eccentricity, to accordingly have structural problems that durability is deteriorated and noise is greatly produced.

Also, the rotating-type vertical movement vibrator produces too a weak intensity of vibration, for example, under a low frequency of 20 Hz or less, to thus provide little vibration effect. Also, the rotating-type vertical movement vibrator produces vibration left and right, or does not perform an accurate vertical movement but a deviated vertical movement, to accordingly give a burden to an articulation of the human body.

Further, the rotating-type vertical movement vibrator uses a rotating motor, and thus has the difficulty in accurately controlling the number of vibration and providing a sufficient vibration force, with respect to a vibration plate.

Meanwhile, a conventional vibrator for generating vibration corresponding to an audio signal using a magnetic circuit of a speaker employing a permanent magnet, has been proposed. However, the conventional vibrator is linked with a portable phone, a game machine, or a stereophonic audio system, and thus is appropriate for making a user feel vibration stereophonically through a user's hand or body in correspondence to an audio signal. However, the conventional vibrator lacks a magnetic force to drive a vibration plate for an aerobic exercise, or has not proposed a proper power transmission and support structure.

Meanwhile, a physical treatment auxiliary instrument, a solid and liquid separator for separating solid and liquid, a selector, and a grain cleaner require for a vibration generator for generating a strong vertical movement force of low frequency. However, since a conventional motor is used as a power generation source, partial wear or noise becomes big problems.

DISCLOSURE

Technical Problem

To solve the above problems, it is an object of the present invention to provide a vertical movement vibrator of a magnetic gap type which can provide a sufficient vertical movement force by employing a structure of disposing a bobbin coil connected to a vibration plate in a magnetic gap of a magnetic circuit using an electric magnet or a permanent magnet having a large magnetic flux density, which can produce a strong magnetic force.

It is another object of the present invention to provide a vertical movement vibrator of a magnetic gap type which can control the number of vertical movement accurately and provide a sufficient vibration effect even in a low-frequency band by controlling frequency and power of a driving signal applied to a bobbin coil.

It is still another object of the present invention to provide a vertical movement vibrator of a magnetic gap type or an industrial vibration generating apparatus, which can support a vibration plate performing a vertical movement using a number of guide axes and linear bearings coupled with the number of guide axes, so that an accurate vertical movement is accomplished, to thereby give little burden to an articulation of the human body, generating little noise, and causing little wear of components due to partial wear, when the vertical movement vibrator of a magnetic gap type or the industrial vibration generating apparatus is applied to an aerobic exercise instrument, in particular, a severe abdominal fatness cure.

Technical Solution

To accomplish the above object of the present invention, according to the present invention, there is provided a vertical movement vibrator comprising: an electric magnet unit comprising a yoke and an electric magnet coil, wherein the yoke comprises: a circular base located at the center of a baseplate; a rod-shaped center pole protruded upwards from the center of the base; a cylindrical outer extension extended by the height of the center pole upwards from the end of the base; and a magnetic gap former which is bent twice and extended inwards from the outer extension thereby forming a magnetic gap between the upper end of the center pole and the bent portion of the outer extension, and wherein the electric magnet coil is wound around the center pole and through which a direct-current (DC) electric power is applied; a driving coil which is movably inserted into the magnetic gap and through which a sinusoidal driving signal is applied; a vibration plate to the lower side of which a bobbin around which the driving coil is wound is attached to accomplish vibration up and down; and a vertical movement guide unit for guiding the vibration plate to perform vertical movement at the time of the up-and-down vibration of the vibration plate.

The vertical movement vibrator further comprises a vibration absorption unit which limits a movement range of the vibration plate when the vibration plate performs a vertical movement, and simultaneously absorbs an impact when the vibration plate falls down. The vibration absorption unit comprises at least three supports having a height control function and at least three elastic members which are inserted between the supports and the vibration plate.

The vertical movement vibrator preferably further comprises a sinusoidal signal generator for generating a sinusoidal signal, a voltage amplifier for voltage-amplifying the sinusoidal signal, and a power amplifier for power-amplifying the voltage-amplified sinusoidal signal to then the power-amplified signal to the driving coil.

In this case, the sinusoidal driving signal has a frequency range of 1 Hz through 60 Hz.

According to another aspect of the present invention, there is also provided a vertical movement vibrator comprising: an electric magnet unit comprising a yoke and an electric magnet coil, wherein the yoke comprises: a center pole; and a space formed in the periphery of the center pole so that portions which are bent four-times and extended from the lower portion of the center pole form the magnetic gap in opposition to the upper portion of the center pole, and wherein the electric magnet coil is wound around the center pole and through which a direct-current (DC) electric power is applied so that the electric magnet coil functions as an electric magnet; a driving coil which is wound around a bobbin and is movably inserted into the magnetic gap and through which a sinusoidal driving signal is applied so that the driving coil is vibrated up and down according to the Fleming's left-hand law; a sinusoidal supply unit for supplying a sinusoidal signal to the driving coil; a vibration plate to the lower side of which the bobbin is attached to accomplish vibration up and down; a vertical movement guide unit for guiding the vibration plate to perform vertical movement at the time of the up-and-down vibration of the vibration plate; and a vibration absorption unit which limits a movement range of the vibration plate when the vibration plate performs a vertical movement, and simultaneously absorbs an impact when the vibration plate falls down.

In this case, the yoke comprises: a circular base located at the center of a baseplate; a rod-shaped center pole protruded upwards from the center of the base, and around which an electric magnet coil is wound; a cylindrical outer extension extended by the height of the center pole upwards from the end of the base; and a magnetic gap former which is bent twice and extended inwards from the outer extension thereby forming a magnetic gap between the upper end of the center pole and the bent portion of the outer extension.

The vertical movement guide unit comprises: at least three up-and-down throughholes formed on the vibration plate; at least three guide bearings fixed in correspondence to the lower sides of the respective throughholes; and at least three guide axes for guiding the vibration plate to perform a vertical linear movement without having any eccentric movement left and right when the respective guide bearings are coupled with the outer circumference of the vibration plate to thereby make the vibration plate perform vibration up and down.

According to still another aspect of the present invention, there is also provided a vertical movement vibrator comprising: at least one magnetic circuit which forms an annular magnetic gap, and forms a non-alternating magnetic field in the magnetic gap; at least one driving coil which is wound around a bobbin and is movably inserted into the magnetic gap, the driving coil being vibrated up and down when a driving signal is applied to generate an alternating magnetic field; a driving signal supply unit for supplying a driving signal having a frequency range of 1 Hz through 60 Hz to the driving coil; a vibration plate to the lower side of which the bobbin is attached to accomplish vibration up and down; a vertical movement guide unit for guiding the vibration plate to perform vertical movement at the time of the up-and-down vibration of the vibration plate; and a movement range limitation and vibration absorption unit which limits a movement range of the vibration plate when the vibration plate performs a vertical movement, and simultaneously absorbs an impact when the vibration plate falls down.

ADVANTAGEOUS EFFECTS

As described above, the present invention provides a vertical movement vibrator for an aerobic exercise which can provide a sufficient vertical movement force by driving a vibration plate connected to a bobbin coil by a magnetic circuit using an electric magnet which can produce a strong magnetic force, which can control the number of vertical movement accurately even in a low-frequency band, and which can support the vibration plate so that an accurate vertical movement is accomplished, to thereby give little burden to an articulation of the human body, generating little noise, and causing little wear of components due to partial wear.

DESCRIPTION OF DRAWINGS

The above and other objects and advantages of the present invention will become more apparent by describing the preferred embodiment thereof in detail with reference to the accompanying drawing in which.

BEST MODE

Figure 1:
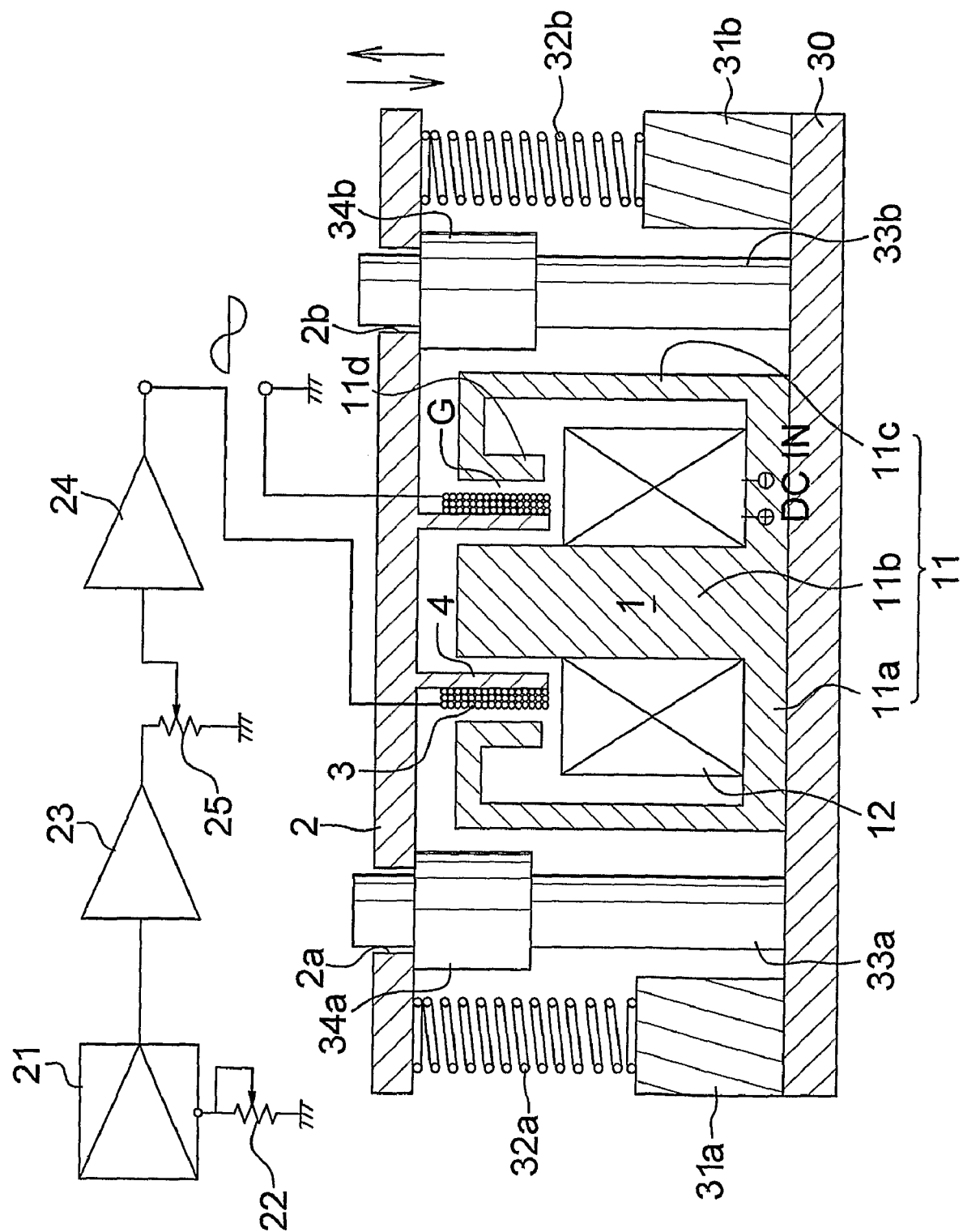
FIG. 1 is a schematic view showing the whole structure of a vertical movement vibrator according to an embodiment of the present invention.

Hereinbelow, a vertical movement vibrator according to the present invention will be described with reference to the accompanying drawing.

Referring to FIG. 1, a vertical movement vibrator of a magnetic gap type according to an embodiment of the present invention has a structure that a bobbin 4 around which a driving coil 3 is wound for driving a vibration plate 2 up and down is inserted in a magnetic gap "G" formed in a magnetic circuit using an electric magnet unit 1.

The electric magnet unit 1 has a structure that a coil 12 through which a direct-current (DC) power is applied is wound around a yoke 11 mounted at the center of a baseplate 30 via an insulation material (not shown), to thereby supply a strong and persistent non-alternating magnetic flux into the magnetic circuit so that the driving coil 3 moves up and down according to the Fleming's left-hand law.

The yoke 11 forming a magnetic circuit path includes: a circular base 11a located at the center of a baseplate 30; a rod-shaped center pole 11b protruded upwards from the center of the base 11a and around which a coil 12 is wound; a cylindrical outer extension 11c extended by the height of the center pole 11b upwards from the end of the base 11a; and a magnetic gap former 11d which is bent twice and extended inwards from the outer extension 11c thereby forming a magnetic gap "G" between the upper end of the center pole 11b and the bent portion of the outer extension 11c.

Thus, the yoke structure has a space structure between the center pole 11b and the outer extension 11c so that a sufficient amount of electric magnet coil 12 is wound, to thereby form a strong electric magnet unit 1. In this case, in order to make a magnetic force effectively reach the driving coil which is inserted into the magnetic gap "G" to thus vibrate up and down, the magnetic gap former 11d should be formed long to sufficiently cover the vibrating range of the driving coil 3.

In the case that the magnetic gap former 11d is bent twice and extended inwards from the outer extension 11c as described above, the magnetic force is concentrated into the magnetic gap former 11d to thereby enhance an electromagnetic efficiency.

The electric magnet coil 12 wound around the center pole 11b of the yoke 11 is designed to have a winding direction of coil and a flow direction of current so that the upper end of the center pole 11b forms an N-pole and the magnetic gap former 11d forms an S-pole.

Thus, when a sinusoidal driving signal whose polarity varies periodically is applied to the driving coil 3, an alternating magnetic field of the driving coil 3 and the non-alternating magnetic field of the magnetic gap "G" interacts mutually, and the driving coil 3 wound around the bobbin 4 vibrates up and down within the magnetic gap "G" and thus the vibration plate 2 also vibrates up and down.

In this case, the vibration plate 2 includes at least three up-and-down throughholes 2a and 2b. Guide bearings 34a and 34b corresponding to the throughholes 2a and 2b are fixed to the lower side of the throughholes 2a and 2b. Also, the guide bearings 34a and 34b are inserted into at least three guide axes 33a and 33b whose lower ends are fixed to the baseplate 30 at a distance from the outer side of the yoke 11. The guide axes 33a and 33b play a role of guiding the vibration plate 2 to perform a vertical linear movement without any eccentric movement left and right when the vibration plate 2 vibrates up and down.

Also, a vibration absorption unit includes at least three vibration absorption members 32a and 32b which limit a movement range of the vibration plate 2 when the vibration plate 2 performs a vertical movement, and simultaneously absorbs an impact when the vibration plate 2 falls down. One end of each vibration absorption member is connected with the vibration plate 2, and the other end thereof is installed on the supports 31a and 31b. Preferably the supports 31a and 31b have a height control function.

The vibration absorption members 32a and 32b are preferably made of a compression spring, respectively. Also, a shock absorber or elastic rubber can be used as the vibration absorption members 32a and 32b. The vibration absorption members 32a and 32b are selected to have a proper elastic coefficient to play a role of determining an ascendant position (upper dead point) and a descendent position (lower dead point) of the vibration plate 2. As described above, the vibration range of the vibration plate 2 is determined by determining an elastic coefficient (damping ratio) of the vibration absorption members 32a and 32b in advance, and a minute vibration range of the vibration plate 2 is adjusted by using a height control function of the supports 31a and 31b.

The vibration absorption members 32a and 32b and the guide axes 33a and 33b which are necessary to absorb an impact and linearly guide the vibration plate 2 to perform a vertical movement when the vibration plate 2 vibrates, are preferably made of three or more supports, more preferably, four supports, so that the center of gravity is generally balanced to avoid instability even though a user is positioned beyond the center of the vibration plate 2.

Meanwhile, in order to apply a sinusoidal driving signal whose polarity varies periodically to the driving coil 3, the vertical movement vibrator preferably includes: a sinusoidal signal generator 21 having a frequency setting variable resistor 22, for generating a sinusoidal signal of a range of 1 Hz through 60 Hz according to setting of a resistance value of the frequency setting variable resistor 22; a voltage amplifier 23 for voltage-amplifying the sinusoidal signal from the sinusoidal signal generator 21; a power amplifier 24 for power-amplifying the voltage-amplified sinusoidal signal to then the power-amplified signal to the driving coil; a power control variable resistor 25 which is inserted between the voltage amplifier 23 and the power amplifier 24, for controlling a voltage value applied to the power amplifier 24 to thereby make power of the driving signal applied to the driving coil 3 selected.

The function of the vertical movement vibrator according to the present invention will be described below.

First, a DC electric power is applied to the electric magnet coil 12 and then the coil 12 is excited. Then, the yoke 11 forms an electric magnet. As a result, the upper end of the center pole 11b forms an N-pole and the magnetic gap former 11d forms an S-pole. Accordingly, a magnetic gap "G" is formed between the upper end of the center pole 11b and the magnetic gap former 11d in the magnetic circuit formed by the yoke 11 of the electric magnet 1.

Here, a user adjusts the frequency setting variable resistor 22 and sets his or her desired resistance value (that is, a frequency value). Accordingly, a sinusoidal signal having a frequency range of 1 Hz through 60 Hz, in particular, 10 Hz through 20 Hz in the case of an aerobic exercise, is generated from the sinusoidal signal generator 21, and the sinusoidal signal is applied to the voltage amplifier 23. The voltage amplifier 23 performs voltage amplification in advance so that a sufficient power amplification can be executed in the power amplifier 24 which is located at the rear end of the voltage amplifier 23.

Then, the voltage amplified sinusoidal signal is power-amplified using a value selected according to a user's setting value of the power control variable resistor 25. The power-amplified sinusoidal signal is applied to the driving coil 3 wound around the non-magnetic bobbin 4.

Thus, when a sinusoidal driving signal whose polarity varies periodically is applied to the driving coil 3, an alternating magnetic field of the driving coil 3 and the non-alternating magnetic field of the magnetic gap "G" interacts mutually, and the driving coil 3 wound around the bobbin 4 vibrates up and down within the magnetic gap "G" since the polarity of the sinusoidal driving signal is periodically inverted and thus the vibration plate 2 also vibrates up and down.

The vertical movement vibrator according to the present invention employs a structure of making the vibration plate 2 perform a vertical movement up and down along the guide axes 33a and 33b in correspondence to inversion of the polarity of the sinusoidal driving signal. Thus, the number of vertical movements can be controlled accurately in correspondence to the frequency setting value of the sinusoidal driving signal by user. Also, since the guide bearings 34a and 34b on the vibration plate 2 slide up and down along the guide axes 33a and 33b at the time of the vertical movement of the vibration plate 2, little noise is generated.

Thus, since the conventional vertical movement vibrator rotationally drives an eccentric weight employing a rotating motor, an intensity off vibration is weak at a low frequency of 20 Hz or less, and also an accurate vertical movement is not accomplished, to thus give a burden to the articulation of the knee in the human body. However, the vertical movement vibrator according to the present invention generates an accurate vertical movement in correspondence to a user setting frequency. Also, in the case of the vertical movement vibrator according to the present invention, a driving coil 3 is inserted in a magnetic gap of the magnetic circuit using an electric magnet unit 1 which can generate a strong magnetic force even in the frequency of 20 Hz or less, to thus provide a user with a sufficient vertical movement force.

The vertical movement vibrator according to the present invention supports the vibration plate performing a vertical movement by means of a number of guide axes and a number of guide bearings coupled with the guide axes, so that an accurate vertical movement can be achieved. As a result, when the vertical movement vibrator according to the present invention is applied to an aerobic exercise training instrument, in particular, a severe abdominal fatness cure, the articulation of the human body is free from impact because of an accurate vertical movement.

Also, the vertical movement vibrator according to the present invention does not have any frictional or collision portions. Thus, the present invention produces little noise and little wear of components due to partial wear, to thereby enhance durability.

As described above, the present invention has been described with respect to the case that a vibration plate is driven by a magnetic circuit using an electric magnet unit. However, it is possible to construct a vibration plate with a magnetic circuit using a permanent magnet. An aerobic exercise vertical movement vibrator requires for generating an approximate 20 mm up-and-down movement at a frequency range of 1 Hz through 60 Hz even in the case that a person who is fat with a weight of at least 50 Kg through at maximum 300 Kg mounts the vibration plate.

In the case of using a permanent magnet, for example, if an inner magnetic field type magnetic circuit having an annular magnetic gap is implemented using an expansive Neodymium (Nd) magnet whose magnetic flux density is known the most excellent, the manufacturing cost thereof increases in comparison with the magnetic circuit using the electric magnet unit, but can generate a DC magnetic field of about 4000 Gauss required for driving the vibration plate of the aerobic exercise vertical movement vibrator.

Also, a sinusoidal driving signal whose polarity varies periodically is applied to a driving coil 3 from the sinusoidal signal generator 21 so that an alternating magnetic filed can be generated in the driving coil 3 in the embodiment of the present invention. However, it is possible to apply a rectangular driving signal to the driving coil 3 instead of the sinusoidal driving signal in order to generate an alternating magnetic field. That is, it is possible to use a rectangular signal generator instead of the sinusoidal signal generator.

Further, an electric magnet unit 1 and a bobbin 4 around which a driving coil 3 is wound are used to drive a vibration plate 2 in the embodiment of the present invention. However, two or more magnetic circuits and driving coils can be used to provide a sufficient vertical movement force to a vibration plate 2, in which each bobbin 4 is connected with the vibration plate 2.

As described above, the present invention provides a vertical movement vibrator for an aerobic exercise which can provide a sufficient vertical movement force by driving a vibration plate connected to a bobbin coil by a magnetic circuit using an electric magnet which can produce a strong magnetic force, which can control the number of vertical movement accurately even in a low-frequency band, and which can support the vibration plate so that an accurate vertical movement is accomplished, to thereby give little burden to an articulation of the human body, generating little noise, and causing little wear of components due to partial wear.

INDUSTRIAL APPLICABILITY

The vertical movement vibrator according to the present invention is not only used as an aerobic exercise instrument, but also can easily set an accurate number of times of vibrations per minute and provide a sufficient vibration intensity using a strong electric magnet unit, to then be applied in various forms to an industrial vibration generator such as a physical treatment auxiliary instrument, a solid and liquid separator for separating solid and liquid, a selector, and a grain cleaner.

As described above, the present invention has been described with respect to particularly preferred embodiment. However, the present invention is not limited to the above embodiment, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The invention claimed is:

1. A vertical movement vibrator comprising:
    a baseplate;
    an electric magnet unit comprising a yoke and an electric magnet coil, wherein the yoke comprises: a circular base located at the center of the baseplate; a rod-shaped center pole protruded upwards from the center of the base; a cylindrical outer extension extended by the height of the center pole upwards from the end of the base; and a magnetic gap former which is bent twice and extended inwards from the outer extension thereby forming a magnetic gap between the upper end of the center pole and the bent portion of the outer extension, and wherein the electric magnet coil is wound around the center pole and through which a direct-current (DC) electric power is applied;
    a driving coil which is movably inserted into the magnetic gap and through which an alternating driving signal is applied;

a vibration plate to the lower side of which a bobbin around which the driving coil is wound is attached to accomplish vibration up and down;

a vertical movement guide unit for guiding the vibration plate to perform vertical movement at the time of the up-and-down vibration of the vibration plate; and a movement range limiting and vibration absorption unit which limits a movement range of the vibration plate when the vibration plate performs a vertical movement, and simultaneously absorbs an impact when the vibration plate falls down.

2. The vertical movement vibrator of claim 1, wherein the movement range limiting and vibration absorption unit comprises at least three supports having a height control function and at least three elastic members which are inserted between the supports and the vibration plate.

3. The vertical movement vibrator of claim 1, wherein the alternating driving signal supplied to the driving coil is a rectangular signal.

4. The vertical movement vibrator of claim 1, further comprising a sinusoidal signal generator for generating a sinusoidal signal as the alternating driving signal, a voltage amplifier for voltage-amplifying the sinusoidal signal, and a power amplifier for power-amplifying the voltage-amplified sinusoidal signal to then apply the power-amplified signal to the driving coil.

5. The vertical movement vibrator of claim 4, wherein the sinusoidal driving signal has a frequency range of 1 Hz through 60 Hz.

6. A vertical movement vibrator comprising:

an electric magnet unit comprising a yoke and an electric magnet coil, wherein the yoke comprises: a center pole; and an yoke extension portion spaced in the periphery of the center pole so that the yoke extension portion which is bent four-times and extended from the lower portion of the center pole forms the magnetic gap in opposition to the upper portion of the center pole, and wherein the electric magnet coil is wound around the center pole and through which a direct-current (DC) electric power is applied so that the center pole functions as an electric magnet;

a driving coil which is wound around a bobbin and is movably inserted into the magnetic gap, the driving coil being vibrated up and down according to the Fleming's left-hand law when a sinusoidal driving signal is applied;

a sinusoidal supply unit for supplying a sinusoidal signal to the driving coil;

a vibration plate to the lower side of which the bobbin is attached to accomplish vibration up and down;

a vertical movement guide unit for guiding the vibration plate to perform vertical movement at the time of the up-and-down vibration of the vibration plate, wherein the vertical movement guide unit comprises: at least three up-and-down throughholes formed on the vibration plate; at least three guide bearings fixed in correspondence to the lower sides of the respective throughholes; and at least three guide axes for guiding the vibration plate to perform a vertical linear movement without having any eccentric movement left and right when the respective guide bearings are coupled with the outer circumference of the vibration plate to thereby make the vibration plate perform vibration up and down; and a movement range limiting and vibration absorption unit which limits a movement range of the vibration plate when the vibration plate performs a vertical movement, and simultaneously absorbs an impact when the vibration plate falls down.

7. The vertical movement vibrator of claim 6, wherein the yoke comprises: a circular base located at the center of a baseplate; a rod-shaped center pole protruded upwards from the center of the base, and around which an electric magnet coil is wound; a cylindrical outer extension extended by the height of the center pole upwards from the end of the base; and a magnetic gap former which is bent twice and extended inwards from the outer extension thereby forming a magnetic gap between the upper end of the center pole and the bent portion of the outer extension.

8. A vertical movement vibrator comprising:

an electric magnet unit forming an annular magnetic gap and in which a non-alternating magnetic field is formed in the magnetic gap;

a driving coil which is wound around a bobbin and is movably inserted into the magnetic gap and through which a driving signal is applied to generate an alternating magnetic field, so that the driving coil is vibrated up and down;

a driving signal supply unit for supplying a driving signal to the driving coil;

a vibration plate to the lower side of which the bobbin is attached to accomplish vibration up and down;

a vertical movement guide unit for guiding the vibration plate to perform vertical movement at the time of the up-and-down vibration of the vibration plate, wherein the vertical movement guide unit comprises: at least three up-and-down throughholes formed on the vibration plate; at least three guide bearings fixed in correspondence to the lower sides of the respective throughholes; and at least three guide axes for guiding the vibration plate to perform a vertical linear movement without having any eccentric movement left and right when the respective guide bearings are coupled with the outer circumference of the vibration plate to thereby make the vibration plate perform vibration up and down; and means for limiting a movement range of the vibration plate when the vibration plate performs a vertical movement, and simultaneously absorbing an impact when the vibration plate falls down.

9. A vertical movement vibrator comprising:

at least one magnetic circuit which forms an annular magnetic gap, and forms a non-alternating magnetic field in the magnetic gap;

at least one driving coil which is wound around a bobbin and is movably inserted into the magnetic gap, the driving coil being vibrated up and down when a driving signal is applied to generate an alternating magnetic field;

a driving signal supply unit for supplying a driving signal having a frequency range of 1 Hz through 60 Hz to the driving coil;

a vibration plate to the lower side of which the bobbin is attached to accomplish vibration up and down;

a vertical movement guide unit for guiding the vibration plate to perform vertical movement at the time of the up-and-down vibration of the vibration plate; and a movement range limitation and vibration absorption unit which limits a movement range of the vibration plate when the vibration plate performs a vertical movement, and simultaneously absorbs an impact when the vibration plate falls down.

10. The vertical movement vibrator of claim 9, wherein the vertical movement guide unit comprises: at least three up-and-down throughholes formed on the vibration plate; at least three guide bearings fixed in correspondence to the lower sides of the respective throughholes; and at least three guide axes for guiding the vibration plate to perform a vertical linear movement without having any eccentric movement left and right when the respective guide bearings are coupled with the outer circumference of the vibration plate to thereby make the vibration plate perform vibration up and down.

* * * * *